US008396129B2

(12) United States Patent
Wei

(10) Patent No.: US 8,396,129 B2
(45) Date of Patent: Mar. 12, 2013

(54) APPARATUS AND METHOD FOR SINGLE-PASS, GRADIENT-BASED MOTION COMPENSATED IMAGE RATE CONVERSION

(75) Inventor: Jeff X. Wei, Richmond Hill (CA)

(73) Assignee: ATI Technologies ULC, Markham, Ontario (CA)

(*) Notice: Subject to any disclaimer, the term of this patent is extended or adjusted under 35 U.S.C. 154(b) by 1440 days.

(21) Appl. No.: 11/965,947

(22) Filed: Dec. 28, 2007

(65) Prior Publication Data

US 2009/0167778 A1    Jul. 2, 2009

(51) Int. Cl.
H04N 7/28    (2006.01)

(52) U.S. Cl. .................. 375/240.16; 382/298; 345/587; 348/699

(58) Field of Classification Search ............. 375/240.16; 382/298; 345/587; 348/699
See application file for complete search history.

(56) References Cited

U.S. PATENT DOCUMENTS

| 4,472,732 A | 9/1984 | Bennett et al. |
| 4,631,750 A | 12/1986 | Gabriel et al. |
| 4,669,100 A | 5/1987 | Slotboom et al. |
| 4,680,628 A | 7/1987 | Wojcik et al. |
| 4,740,842 A | 4/1988 | Annegarn et al. |
| 4,750,057 A | 6/1988 | Baumeister |
| 4,800,436 A | 1/1989 | Polaert et al. |
| 4,868,655 A | 9/1989 | Choquet et al. |
| 4,881,125 A | 11/1989 | Krause |
| 4,908,874 A | 3/1990 | Gabriel |
| 4,941,045 A | 7/1990 | Birch |
| 4,947,251 A | 8/1990 | Hentschel |
| 4,982,280 A | 1/1991 | Lyon et al. |
| 4,989,090 A | 1/1991 | Campbell et al. |
| 4,992,982 A | 2/1991 | Steenhof |
| 4,998,153 A | 3/1991 | Kuyk et al. |
| 5,014,119 A | 5/1991 | Faroudja |

(Continued)

FOREIGN PATENT DOCUMENTS

| EP | 0690617 A2 | 1/1996 |
| EP | 0739129 A2 | 10/1996 |

(Continued)

OTHER PUBLICATIONS

Le Gall; Compression Standard for Multimedia Applications; Association for Computing Machinery; vol. 34, No. 4; pp. 47-58, Apr. 1991.

(Continued)

*Primary Examiner* — Christopher S Kelley
*Assistant Examiner* — Maria Vazquez Colon
(74) *Attorney, Agent, or Firm* — Faegre Baker Daniels LLP

(57) ABSTRACT

A mipmap generator generates pairs of mipmaps that are each of a lower resolution that its respective source image. A single-pass, gradient-based motion vector generator generates an image motion vector map having values that represent the motion trajectories for pixels in the first and second source images. An image interpolator generates an interpolated image based on the source images and the image motion vector map. A motion detector generates a motion factor map based on a pair of mipmaps from those generated by the mipmap generator that represents a detected degree of motion between the first and second source images. The blending module generates a blended, upconverted new image using the motion factor map, the interpolated image and one of the first and second motion maps.

24 Claims, 10 Drawing Sheets

U.S. PATENT DOCUMENTS

| | | |
|---|---|---|
| 5,046,164 A | 9/1991 | Hurst, Jr. |
| 5,055,927 A | 10/1991 | Keesen et al. |
| 5,101,403 A | 3/1992 | Balzano |
| 5,128,791 A | 7/1992 | LeGall et al. |
| 5,134,480 A | 7/1992 | Wang et al. |
| 5,144,429 A | 9/1992 | Haghiri et al. |
| 5,151,783 A | 9/1992 | Faroudja |
| 5,159,451 A | 10/1992 | Faroudja et al. |
| 5,191,576 A | 3/1993 | Pommier et al. |
| 5,193,004 A | 3/1993 | Wang et al. |
| 5,233,421 A | 8/1993 | Chrisopher et al. |
| 5,237,414 A | 8/1993 | Faroudja |
| 5,289,305 A | 2/1994 | Lake, Jr. |
| 5,305,104 A | 4/1994 | Jensen et al. |
| 5,327,240 A | 7/1994 | Golston et al. |
| 5,351,083 A | 9/1994 | Tsukagoshi |
| 5,408,270 A | 4/1995 | Lim |
| 5,428,398 A | 6/1995 | Faroudja |
| 5,436,663 A | 7/1995 | Guede |
| 5,467,138 A | 11/1995 | Gove |
| 5,488,419 A | 1/1996 | Hui et al. |
| 5,488,421 A | 1/1996 | Hwang et al. |
| 5,508,746 A | 4/1996 | Lim |
| 5,517,247 A | 5/1996 | Correa et al. |
| 5,521,644 A | 5/1996 | Sezan et al. |
| 5,532,750 A | 7/1996 | De Haan et al. |
| 5,596,371 A | 1/1997 | Pakhchyan et al. |
| 5,600,731 A | 2/1997 | Sezan et al. |
| 5,602,654 A | 2/1997 | Patti et al. |
| 5,619,272 A | 4/1997 | Salmon et al. |
| 5,621,470 A | 4/1997 | Sid-Ahmed |
| 5,621,481 A | 4/1997 | Yasuda et al. |
| 5,627,555 A | 5/1997 | den Hollander |
| 5,661,525 A | 8/1997 | Kovacevic et al. |
| 5,682,205 A | 10/1997 | Sezan et al. |
| 5,689,305 A | 11/1997 | Ng et al. |
| 5,724,098 A | 3/1998 | Murakami et al. |
| 5,754,248 A | 5/1998 | Faroudja |
| 5,774,593 A | 6/1998 | Zick et al. |
| 5,784,115 A | 7/1998 | Bozdagi |
| 5,793,435 A | 8/1998 | Ward et al. |
| 5,844,614 A | 12/1998 | Chong et al. |
| 5,864,369 A | 1/1999 | Swan |
| 5,929,913 A | 7/1999 | Etoh |
| 5,936,670 A | 8/1999 | Frencken |
| 5,943,099 A | 8/1999 | Kim |
| 5,995,154 A | 11/1999 | Heimburger |
| 6,037,986 A | 3/2000 | Zhang et al. |
| 6,118,486 A | 9/2000 | Reitmeier |
| 6,118,488 A | 9/2000 | Huang |
| 6,121,978 A | 9/2000 | Miler |
| 6,141,056 A | 10/2000 | Westerman |
| 6,188,437 B1 | 2/2001 | Webb et al. |
| 6,192,079 B1 * | 2/2001 | Sharma et al. ........... 375/240.16 |
| 6,208,350 B1 | 3/2001 | Herrera |
| 6,239,842 B1 | 5/2001 | Segman |
| 6,266,092 B1 | 7/2001 | Wang et al. |
| 6,330,032 B1 | 12/2001 | Boehlke |
| 6,340,990 B1 | 1/2002 | Wilson |
| 6,370,198 B1 | 4/2002 | Washino |
| 6,392,706 B1 | 5/2002 | Sugiyama |
| 6,414,719 B1 | 7/2002 | Parikh |
| 6,437,828 B1 | 8/2002 | Chambers et al. |
| 6,456,329 B1 | 9/2002 | Tinker et al. |
| 6,459,454 B1 | 10/2002 | Walters |
| 6,459,455 B1 | 10/2002 | Jiang et al. |
| 6,473,460 B1 | 10/2002 | Topper |
| 6,487,304 B1 | 11/2002 | Szeliski |
| 6,549,240 B1 | 4/2003 | Reitmeier |
| 6,570,624 B2 | 5/2003 | Corong et al. |
| 6,690,427 B2 | 2/2004 | Swan |
| 6,970,206 B1 | 11/2005 | Swan et al. |
| 6,975,359 B2 * | 12/2005 | Jiang ............................ 348/348 |
| 7,218,355 B2 | 5/2007 | Zhou et al. |
| 7,558,320 B2 * | 7/2009 | Winder et al. ........... 375/240.12 |
| 2002/0054236 A1 | 5/2002 | Wredenhagen et al. |
| 2002/0075412 A1 | 6/2002 | Tang et al. |
| 2002/0101535 A1 | 8/2002 | Swan |
| 2003/0156301 A1 | 8/2003 | Kempf et al. |
| 2005/0078214 A1 | 4/2005 | Wong et al. |

FOREIGN PATENT DOCUMENTS

| | | |
|---|---|---|
| EP | 1207693 A2 | 5/2002 |
| EP | 1515543 A2 | 3/2005 |
| EP | 1596595 A1 | 11/2005 |
| JP | 10-322626 | 12/1998 |

OTHER PUBLICATIONS

ISO/IEC DIS 13818-2 Draft International Standard Information Technology—Generic coding of moving pictures and associated audio information—Part 2 Video, May 10, 1994, pp. 1-1.

A. Murat Tekalp, "Digital Video Processing," Chapter 16—Standards Conversion, pp. 302-330—1995.

European Search Report dated Mar. 28, 2006 for EP Application No. EP04255496, pp. 1-3.

Weinand, Lars, TV-Tuner and Videoschnitt: Ati All-In-Wonder RADEON 8500DV; from Tom's Hardware Guide (online); Dec. 11, 2001, pp. 1-2.

Weinand, Lars, Neue Mainstream-Klasse; Radeon 9000 (RV250), from Tom's Hardware Guide (online), Jul. 18, 2002, pp. 1-6.

ATI Technologies, White Paper Radeon Digital Video, from www.ati.com, Jun. 14, 2000, pp. 1-20.

Yoshida, Junko, Phillips new chip said to remove LCD TV artifacts; EE Times, Jul. 8, 2003, pp. 1-2, www.eetimes.com/sys/OEG20030708S0017.

Bock, A.M., Motion-adaptive standards conversion between formats of similar field rates, Signal Processing Image Communication, Jul. 31, 1993, pp. 275-280.

Woods, John, W., et al., Hierarchical Motion Compensated De-interlacing; SPIE, Nov. 11, 1991, pp. 805-810.

De Haan, Gerard et al., Deinterlacing—An Overview; IEEE, Sep. 1998, vol. 86, No. 9, pp. 1839-1857.

European Search Report for EP Application No. EP05252564, Aug. 29, 2005.

Martinez, Dennis M. et al.; Spatial Interpolation of Interlaced Television Pictures; IEEE; 1989; pp. 1886-1889.

Bakker, P. et al.; Edge preserving orientation adaptive filtering; IEEE; 1999; pp. 535-540.

Tai, S.C. et al.; A Motion and Edge Adaptive Deinterlacing Algorithm; IEEE Int'l Conf. on Multimedia and Expo; 2004; pp. 659-662.

U.S. Appl. No. 11/467,978, entitled Method and Apparatus for Interpolating Image Information, filed Aug. 29, 2006.

Zhao, M. et al.; Intra-field de-interlacing with advanced up-scaling methods; IEEE 2004; pp. 315-319.

Li, Xin et al.; New Edge-Directed Interpolation; IEEE; vol. 10, No. 10, Oct. 2001; pp. 1521-1527.

Jensen, Kris et al.; Subpixel Edge Localization and the Interpolation of Still Images; IEEE; vol. 4, No. 3; Mar. 1995; pp. 285-295.

Hilman, Kevin et al.; Using Motion-Compensated Frame-Rate Conversion for the Correction of 3:2 Pulldown Artifacts in Video Sequences; IEEE; vol. 10, No. 6, Sep. 2000; pp. 869-877.

* cited by examiner

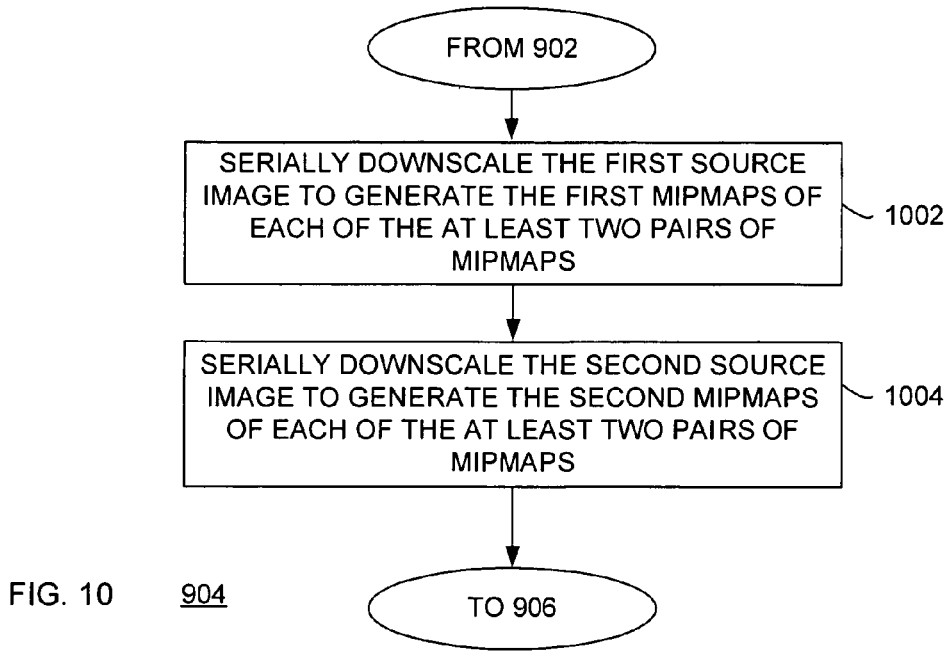

APPARATUS AND METHOD FOR SINGLE-PASS, GRADIENT-BASED MOTION COMPENSATED IMAGE RATE CONVERSION

FIELD OF THE INVENTION

The present disclosure generally relates to image rate conversion, and more particularly, to motion compensation image rate upconversion.

BACKGROUND OF THE INVENTION

It is known to use a variety of devices to display images to a user. As used herein, an image may be a field (e.g., such as in the context of an interlaced image) or a frame (such as in the context of a deinterlaced or progressive image). Televisions, media players (e.g., DVD players), computing devices (e.g., stationary desktop computers), mobile devices (e.g., cellular phones, personal digital assistants, etc.) are each capable of displaying sequences of images (video and/or graphics) to a user. In the context of video, image sequences are generally created using a fixed image rate (a.k.a. frame or field rate, when dealing with frames or fields, specifically). For example, many telecine processes record video (e.g., movies) in real time, i.e., having a image (or frame) rate of 24 Hz. When the video is intended to be displayed on a display device that has a refresh rate that does not match and is faster than the image rate of the source video, the display device must create new images for insertion into the destination (i.e., the output) video stream. For example, many standard television sets in North America refresh at 30 frames per second while many standard computer monitors (e.g., an LCD display) refresh at 60 Hz (and may be as high as 120 Hz).

When a movie having a 24 Hz frame rate is displayed on a display having a refresh rate of 60 Hz, the source sequence of images must be "upconverted" to 60 Hz. The most common method is to simply repeat a previously known frame at a predetermined point in time. This is often accomplished using a 3:2 pulldown where a first image "2n" is repeated three times and a second image "2n+1" is repeated 2 times in a sample and hold process. FIG. 1 illustrates an example of a sample and hold process for a generic upconversion (not specifically an upconversion from 24 Hz to 60 Hz). As shown, the top row represents a source sequence of images including images A, B and C and has a first image rate such that image A is displayed at time TS1, image B is displayed at TS2 and image C is displayed at TS3. The lower "row" of images displays the sequence of upsampled images for a display that has a higher refresh rate or image rate. Thus, upconversion is required for display. The destination sequence of images has a second image rate that is higher or faster than the first image rate such that in this generic example, the first image A is displayed on the display at time TO1 and is repeated at TO2. Subsequently, image B is displayed at time TO3 and again at TO4. Image C is displayed at time TO5, etc.

As is known, sample and hold upconversions such as the 3:2 pulldown create annoying artifacts called motion judder effects in areas where objects move with respect to consecutive images in the source image sequence. In other words, the motion of objects in consecutive images is not smooth in prior art sample and hold upconversions. As a result, the human eye has difficulty focusing on it.

To mitigate against these annoying judder effects, a variety of techniques have been established. The first group of techniques use non-motion compensation such as linear interpolation between two original images. These techniques, however, fail because motion judder is still perceived by the human eye. The second group of techniques are motion compensation based. These techniques attempt to display a moving object in the correct spatial position in the upconverted new image. For example, FIG. 2 shows this concept where an object in a first image A is initially displayed in a first location 202 moves to a new location 204 in second image B, where frames A and B are from the source sequence of images. The upconverted new image Z is designed to place the object in the correct location 206 along the motion trajectory 208.

A first type of motion compensation upconversion is the block matching method that is akin to motion estimation in MPEG, a type of video compression algorithm. Accordingly, block matching techniques are often affiliated with video compression engines. The block matching method takes a first image and a second image of a source sequence and looks for similar blocks within the images. The detection of similar blocks indicates that motion of pixels associated with these blocks. The block matching method, however: (1) is not accurate at the sub-pixel level without using expensive processing resources; (2) is expensive to avoid error; and (3) requires recursive algorithms. As is recognized, if an object moves a non-integer number of pixels (e.g., 2.5 pixel motion), the block matching method requires a pair of upscalers to convert, to a certain degree, subpixel resolution to pixel resolution and then performs the block matching to obtain the amount of motion (in integer pixels) in the upscaled pixel resolution, which corresponds to the subpixel resolution (with fractional pixel) in the original un-upscaled image. Additionally, in order to avoid any error in detection of motion, expensive and recursive processing is required to ensure that the allegedly similar blocks in the second frame were moved from the first frame. In other words, the block matching methods require expensive and recursive processing algorithms to properly "match" the moved blocks. Because block matching methods are not always accurate at the sub-pixel level and because they require expensive and recursive algorithms to implement to avoid error, block matching methods are not desirable.

Another type of motion compensation upconversion is the phase plane correlation method that detections motion in the phase-domain and therefore requires fourier transforms on the images and inverse fourier transforms (e.g., using FFTs and iFFTs) to properly identify and verify motion in images. Because implementation of fourier transforms is computationally expensive, phase plane correlation methods are not desirable.

Yet another type of motion compensation is the optical flow method that measures motion vectors over two consecutive fields using gradient-based and recursive algorithms (in the x, y and t dimensions) to optimize the pixel motion vectors. This method for upconversion is expensive to implement due to its recursive nature. Consequently, the optical flow method of the prior art is also not desirable.

Therefore a need exists to upconvert a source sequence of images to create a destination or output sequence of images having a higher image rate than the source sequence of images while avoiding the expensive collateral consequences of prior art methods.

BRIEF DESCRIPTION OF THE DRAWINGS

The invention will be more readily understood in view of the following description when accompanied by the below figures and wherein like reference numerals represent like elements.

FIG. 10 is an exemplary flow chart of a method for generating at least two pairs of mipmaps in accordance with the method of FIG. 9;

FIG. 11 is an exemplary flow chart of a method for generating, using a single-pass, gradient-based motion vector generator, an image motion vector map in accordance with the method of FIG. 9.

DETAILED DESCRIPTION

Generally, one embodiment of the present disclosure provides an integrated circuit that has a mipmap generator, a single-pass gradient-based motion vector generator and an image interpolator for use in generating an interpolated image based on the first and second source image. The mipmap generator generates pairs of mipmaps that each are of a lower resolution that its respective source image. The single-pass, gradient-based motion vector generator generates an image motion vector map having values that represent the motion trajectories for pixels in the first and second source images. Lastly, the image interpolator generates the interpolated image based on the source images and the image motion vector map. In one embodiment, the interpolated image may be used as an upconverted image in a destination sequence of images. In one embodiment, the mipmap generator is not part of the integrated circuit. In another embodiment, the image interpolator is not part of the integrated circuit.

In one embodiment, a motion detector generates a motion factor map based on a pair of mipmaps from those generated by the mipmap generator. The motion factor map represents a detected degree of motion between the first and second source images. Using the motion factor map, the interpolated image and one of the first and second motion maps, a blending module generates a blended upconverted new image. In one embodiment, the blended upconverted new image is used as the upconverted image in the destination sequence of images.

Accordingly, unlike the expensive and recursive schemes of the prior art, one embodiment of the present disclosure provides a single-pass image motion vector generator. Additionally, unlike other upconverted prior art solutions, the present disclosure significantly reduces unwanted judder artifacts.

In the following detailed description, numerous specific details are set forth in order to provide a thorough understanding the present disclosure. It will be apparent to one of ordinary skill in the art, however, that these specific details need not be used to practice the present disclosure. In other instances, well-known structures, interfaces and processes have not been shown or described in detail in order not to unnecessarily obscure the present invention.

Figure 3:
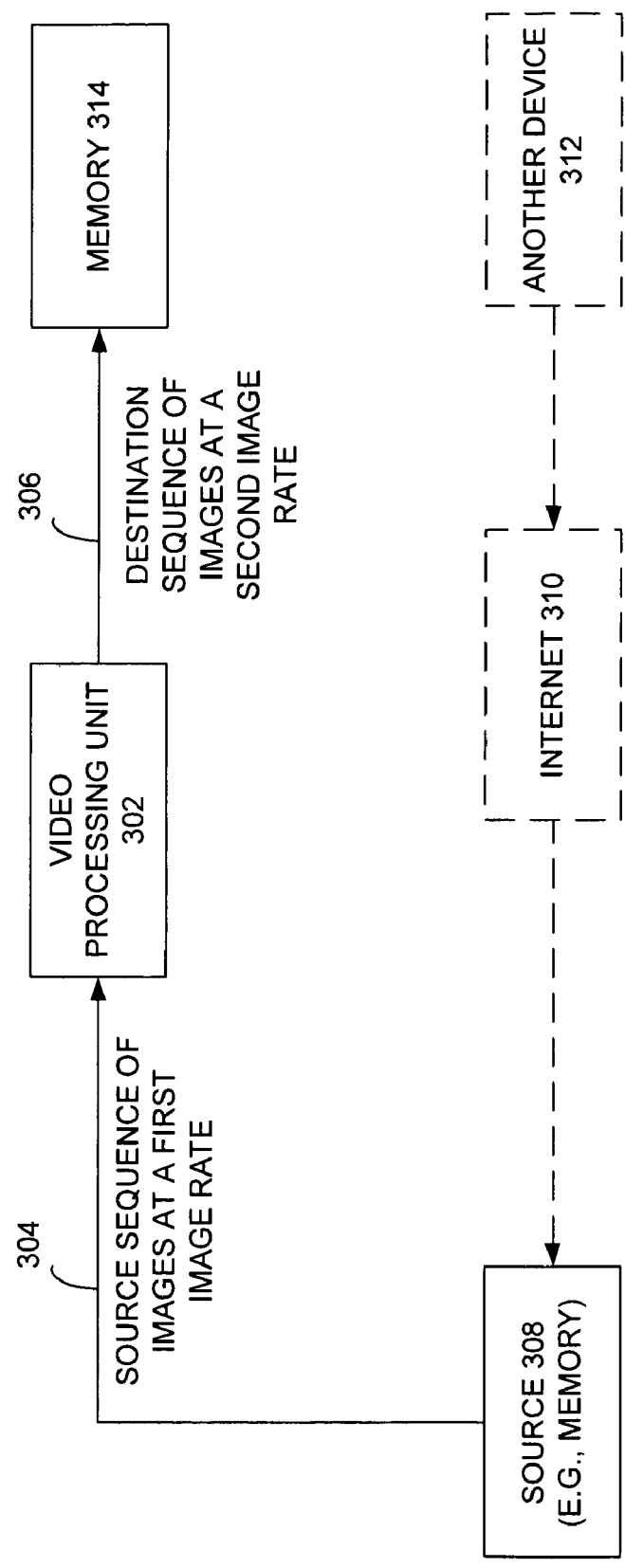
FIG. 3 illustrates a block diagram of a video processing unit that may be part of or independent of a graphics processing unit.

FIG. 3 illustrates a block diagram of a video processing unit 302 that may be part of or independent of a graphics processing unit (not shown). The video processing unit 302 may be implemented using any suitable combination of integrated circuits, application specific integrated circuits (ASICs), digital signal processors (DSPs), processing engines, or any other suitable device and may be any programmable, non-programmable or have a combination or programmable and non-programmable components. For example, if video processing unit 302 is programmable or has programmable components, the programmable components may be implemented using one or more processors coupled to memory that contains executable instructions capable of being executed by the one or more processors. As is recognized, the one or more processors may also take the form of any suitable combination of integrated circuits, application specific integrated circuits (ASICs), digital signal processors (DSPs), processing engines, one or more processing cores of a greater processing device, or any other suitable device. The video processing unit 302 may be part of a graphics processing unit (not shown) that is independent from a central processing unit, for example in a computing devices. The video processing unit 302, in one embodiment, may have components thereof that are capable of processing graphics and thus, in one embodiment, the video processing unit 302 may be termed a "video-graphics processing unit". As used herein, memory includes any type of volatile or non-volatile storage device capable of retaining or storing data that represents information and may include, but is not limited to, ROM, RAM, etc.

As is further recognized the video processing unit 302 may be part of any number of computing devices such as, but not limited to, televisions, media players (e.g., DVD players, set-top boxes), computing devices (e.g., stationary desktop computers), mobile devices (e.g., cellular phones, personal digital assistants, etc.), etc., that are each capable of displaying sequences of images (video and/or graphics) to a user.

Video processing unit 302 receives a source sequence of images 304 at a first image rate and performs an upconversion to generate a destination sequence of images 306 at a second image rate. The source sequence of images 304 may be received from (i.e., transmitted by) any suitable source 308 of images. For example, the source 308 of images may be, for example, memory, another processor, etc. as is known in the art. In one embodiment, video processing unit 302 may be affiliated with a first device coupled to the Internet 310 and the source 208 of images may be another device 312, e.g., a hosting device, also coupled to the Internet 310. In such an example, the source sequence of images 304 may correspond to streaming video received over the Internet 310. In one embodiment, the video processing unit 302 generates the destination sequence of images 306 in accordance with the single-pass, gradient-based motion-compensated image rate conversion as described below with respect to FIGS. 4-12.

In one embodiment, the source sequence of images 304 may correspond to interlaced images (i.e., fields). In one embodiment, video processing unit 302 includes or is coupled to a deinterlacer that first deinterlaces the interlaced images to form deinterlaced frames for the video processing unit 302 to operate upon. In another embodiment, the source sequence of images 304 may correspond to progressive frames or deinterlaced frames. Video processing unit 302 may, in another embodiment, include any other number of components such as, but not limited to, a noise reducer, a video enhances, a video scaler, a frame converter, etc. In one embodiment, video processing unit 302 is a baseband video processing unit. In another embodiment, the source sequence of images 304 is modulated using any suitable modulation scheme and the video processing unit 302 includes a demodulator. It is further recognized that the destination sequence of images 306 may be an interlaced sequence of images, a deinterlaced sequence of images, or a progressive sequence of images. Similarly, destination sequence of images 306 may be modulated or demodulated, as desired. One having ordinary skill in the art, will recognized that video processing unit 302 may be modified or otherwise adopted to conform to any type of sequence of images such that it is adaptable to any type of system.

In another embodiment, video processing unit 302 is coupled to memory 314 (which may, in one embodiment, be the same as source 308) for storage of the destination sequence of images 306. For instance, memory 314 may be a frame buffer that is coupled to a display, wherein the information stored in the frame buffer is used to produces images on the display.

Figure 4:
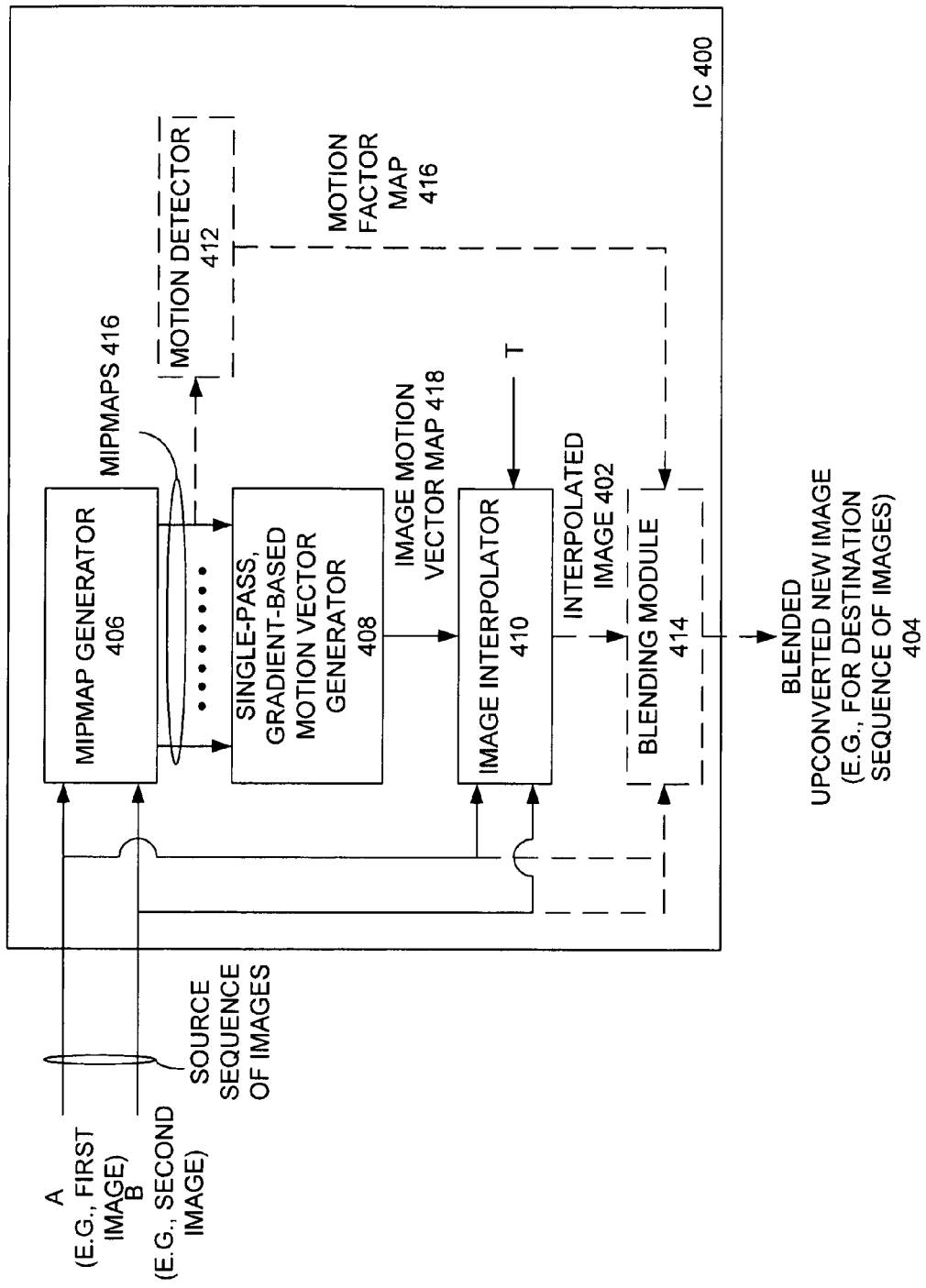
FIG. 4 illustrates a block diagram of an integrated circuit capable of generating an interpolated image and, in one embodiment, an upconverted new image for a upconverted destination sequence of images in accordance with one embodiment of the present disclosure.

FIG. 4 illustrates a block diagram of an integrated circuit 400 capable of generating an interpolated image 402 and, in one embodiment, an upconverted new image 404 for a upconverted destination sequence of images, such as the destination sequence of images 306 of FIG. 3 in accordance with one embodiment of the present disclosure. Integrated circuit 400 includes mipmap generator 406, single-pass, gradient-based motion vector generator 408, image interpolator 410, and, in one embodiment, motion detector 412 and blending module 414. In one embodiment, integrated circuit 400 is part of the video processing unit 300 of FIG. 3. In another embodiment, integrated circuit 400 is the video processing unit 300 of FIG. 3. In yet another embodiment, integrated circuit 400 is an independent device from any video processing units, such as video processing unit 300.

Integrated circuit 400 receives a source sequence of images 304 from any suitable source, e.g., source 308 of FIG. 3. As shown, IC 400 receives a first image A and a second image B from the source sequence of images 304. In one embodiment, first image A and second image B are consecutive images in the first sequence of images 304. IC 400 generates an interpolated image 402 and/or an upconverted new image 404 for use in the destination sequence of images 306. As used herein, the term "integrated circuit" (including IC 400) may include one or more integrated circuits.

Mipmap generator 406 receives the first image A and the second image B from the source sequence of images 304 and generates at least two pairs of mipmaps (designated as mipmaps 416). A first mipmap of each pair of mipmaps is a downsized version of the first source image A whereas the second mipmap of each pair of mipmaps is a downsized version of the second source image B. As recognized, downsized refers to each of the mipmaps having a reduced level of resolution with respect to the source images A and B.

Figure 2:
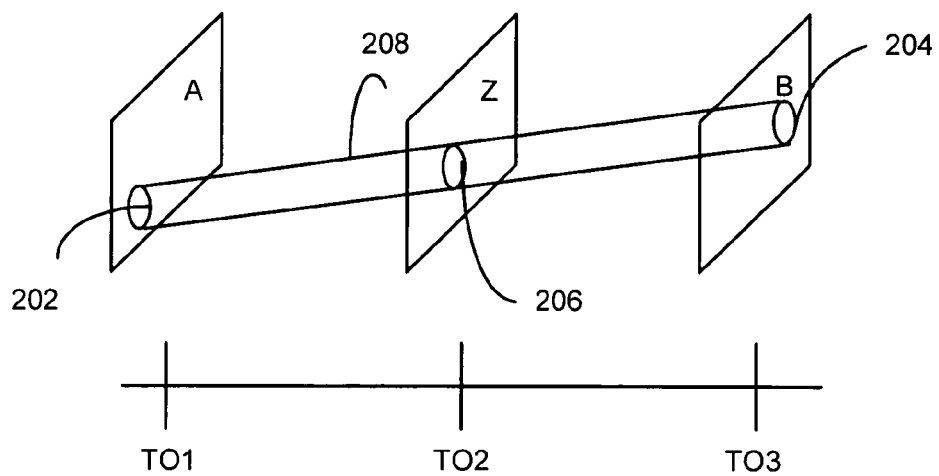
FIG. 2 illustrates a block diagram of an upconverted, motion-compensated image created after detecting motion and a motion trajectory of an object with respect to first and second source images associated with a source sequence of images.

The single-pass, gradient-based motion vector generator 408 receives the at least two pairs of mipmaps and generates an image motion vector map 418 therefrom, wherein the image motion vector map represents the trajectory of motion for pixels in the first and second source images A, B. In one embodiment the trajectory of motion can be visualized as illustrated by FIG. 2, element 208.

Image interpolator 410 receives the first image A, the second image B and the image motion vector map 418. Based on at least these inputs, image interpolator 410 generates an interpolated image 402 by interpolating pixel values along the trajectories associated with the image motion vector map. In one embodiment, image interpolator 410 also receives a time input that represents the time, less than the period associated with the first sequence of images 304, that the upconverted image should be displayed in the destination sequence of images 306. In one embodiment, the interpolated image 402 is used as the upconverted image for the destination sequence of images 306.

In one embodiment, IC 400 includes motion detector 412 and blending module 414. Motion detector generates a motion factor map 416 based on a pair of mipmaps from the at least two pairs of mipmaps. The motion factor map 416 represents a detected degree of motion between the first and second source images A, B. In other words, the motion factor map 416, indicates whether the motion is sufficiently perceivable for the human eye such that it must be accounted for in the upconverted image for the destination sequence of images 306. As used herein and for the sake of clarity, the "terms motion factor map 416" and "image motion vector map 418" are different terms with different meanings. Based on the motion factor map 416, the interpolated image 402 and the second image B, the blending module 414 generates a blended upconverted new image 404 for the destination sequence of images 306. As explained below, the motion factor map 416 affects the contribution of at least one of: the interpolated image 402 and the second image B to the blended upconverted new image 404.

Although IC 400 is illustrated as having mipmap generator 406 as a component thereof, it is contemplated that IC 400 may exclude mipmap generator 406. In one embodiment, mipmap generator 406 may be external to IC 400. In another embodiment, the single-pass, gradient-based motion vector generator 408 may be configured to generate the image motion vector map based on the first source image (i.e., A) and based on the second source image (i.e., B), or any other suitable source images. In other words, the single-pass, gradient-based motion vector generator 408 may contain logic similar to mipmap generator 406, or single-pass, gradient-based motion vector generator 408 may be configured to generate the image motion vector map 418 based on any suitable images or pairs of images that relate to the source sequence of images (i.e., A and B).

Figure 5:
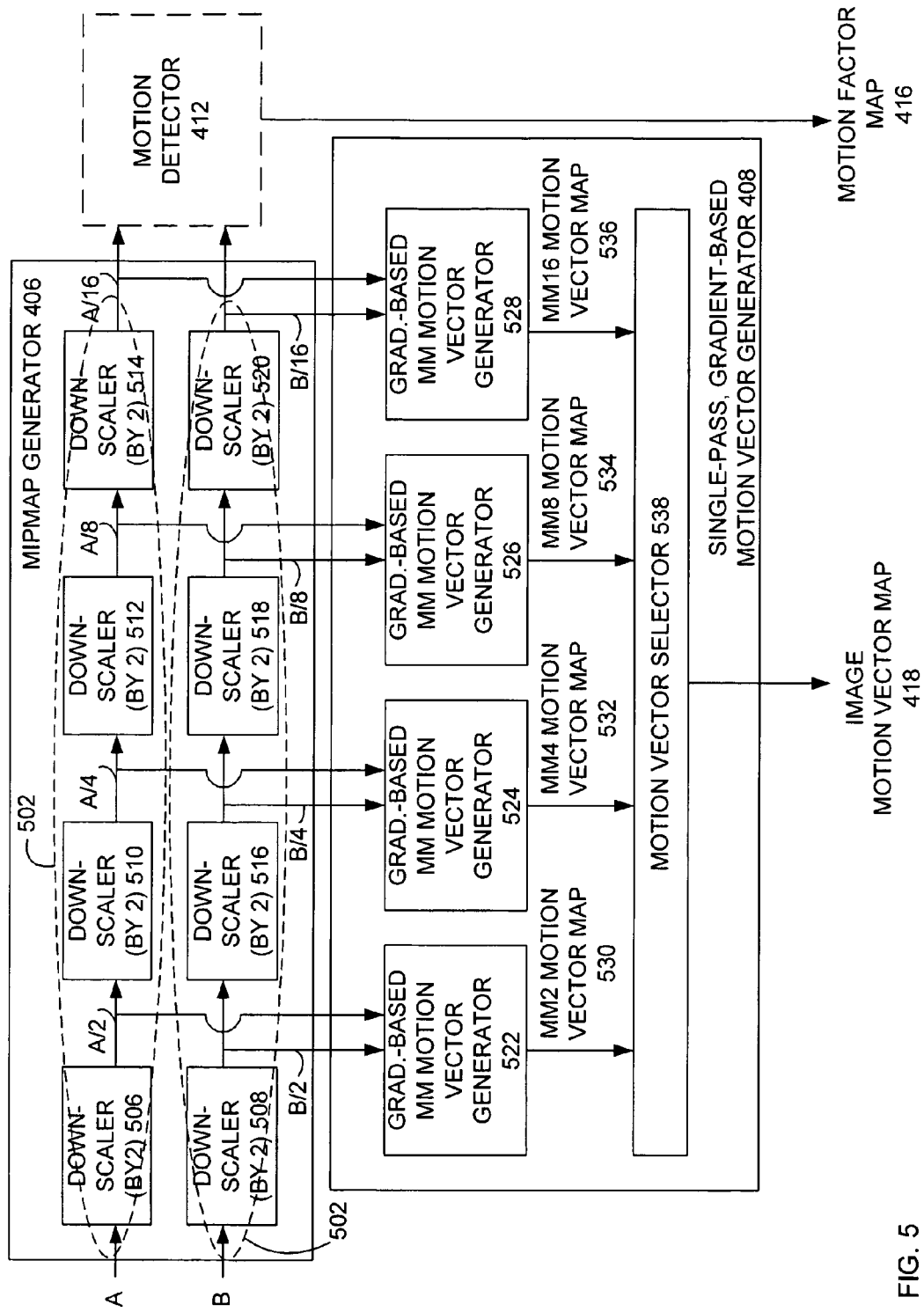
FIG. 5 illustrates an exemplary and more detailed block diagram of the mipmap generator and single-pass, gradient-based motion vector generator of the integrated circuit of FIG. 4.

FIG. 5 illustrates an exemplary and more detailed block diagram of the mipmap generator 406 and single-pass, gradient-based motion vector generator 408 of the integrated circuit of FIG. 4. Mipmap generator 406 includes a first plurality 502 of serially-coupled downscalers associated with the first source image A and a second plurality 504 of serially-coupled downscalers associated with the second source image B. The first plurality 502 of serially-coupled downscalers generate the first mipmaps of each of the at least two pairs of mipmaps while the second plurality 504 of serially-coupled downscalers generate the second mipmaps of each of the at least two pairs of mipmaps. The first downscaler of each of the first and second pluralities 502, 504 (i.e., downscalers 506 and 508) use the first and second source images A, B, respectively, to generate mipmaps. The remainder of the downscalers of each of the first and second pluralities 502, 504 generate mipmaps based on a previously generated mipmap from the first plurality. Alternatively, it is contemplated that one or more downscalers could be repeatedly used to generate the first and second mipmaps of each of the at least two pairs of mipmaps. In such an alternate embodiment, the one or more downscalers may have its output fed back to its input to allow for repetitious use of the downscaler.

In the embodiment illustrated in FIG. 5, the first plurality 502 of serially-coupled downscalers includes 4 downscalers 506, 510-514. Downscalers 506, 510-514 are each downscale by 2 downscalers. That is, each downscaler takes an image and reduces its resolution (and size) by two in both the vertical and horizontal directions. In other embodiments, downscalers 506, 510-514 are downscale by n downscalers, where n is any suitable value. In yet another embodiment, downscalers 506, 510-514 are not identical downscalers and each of the downscalers 506, 510-514 downscale by any suitable value. In the illustrated embodiment, downscalers 506, 510-514 generate mipmaps A/2, A/4, A/8 and A/16. The alpha-numeric reference numerals not only differentiate the mipmaps but also indicate the degree to which each mipmap is downscaled with respect to the first image A. Similarly, the second plurality 504 of serially-coupled downscalers includes 4 downscalers 508, 516-520. Downscalers 508, 516-520 are also each downscale by 2 downscalers. In other embodiments, downscalers 508, 516-520 are downscale by n downscalers, where n is any suitable value. In yet another embodiment, downscalers 508, 516-520 are not identical downscalers and each of the downscalers 508, 516-520 downscale by any suitable value. In the illustrated embodiment, downscalers 508, 516-520 generate mipmaps B/2, B/4, B/8 and B/16. The alpha-numeric reference numerals not only differentiate the mipmaps but also indicate the degree to which each mipmap is downscaled with respect to the first image B.

The single-pass, gradient-based motion vector generator 408 includes at least two gradient-based mipmap motion vector generators 522 and 524, wherein each generates a mipmap motion vector map, e.g., mipmap ("MM") MM2 motion vector map 530 and MM4 motion vector map 532, based on a respective pair of mipmaps, e.g., A/2 and B/2, and A/4 and B/4. Each of the mipmap motion vector maps represents the trajectory of motion for pixels in the respective pair of mipmaps (e.g., A/2 and B/2, and A/4 and B/4). For example, each value in the mipmap motion vector map has two components: an x and a y component that indicates the vertical and/or horizontal direction of motion, if any. In the embodiment illustrated in FIG. 5, the single-pass, gradient-based motion vector generator 408 includes two additional gradient-based mipmap motion vector generators 526 and 528 (i.e., one gradient-based mipmap motion vector generator per each pair of mipmaps generated by the mipmap generator 406). Gradient-based mipmap motion vector generators 526 and 528 generate MM8 motion vector map 534 based on (and representing the trajectory of motion of pixel values in) A/8 and B/8, and MM16 motion vector map 536 (and representing the trajectory of motion of pixel values in) based on A/16 and B/16, respectively.

Each of the gradient-based mipmap motion vector generators 522-528 operate in an identical manner, but on differently sized mipmaps. Accordingly a detailed algorithm is provided below with respect to the gradient-based mipmap motion vector generator 522. It is recognized that each other gradient-based mipmap motion vector generator (e.g., 524-528) operates, in one embodiment, in the same manner.

The detailed algorithm used by gradient-based mipmap motion vector generator 522 in one embodiment of the present disclosure requires the construction of a first order horizontal gradient map and a first order vertical gradient map for each of the mipmaps input to the gradient-based mipmap motion vector generator 522, e.g., A/2 and B/2. Each value in the first order horizontal gradient map represents the difference between the sum of the current pixel values in A/2 and B/2 and the sum of the left (or right) neighboring horizontal pixel values in A/2 and B/2. In contrast, each value in the first order vertical gradient map represents the difference between the sum of the current pixel values in A/2 and B/2 and the sum of the upper (or lower) neighboring horizontal pixel values in A/2 and B/2. In other words, C=each value in the first order horizontal gradient map represents the difference between the current pixel values and the left (or right) neighboring horizontal pixel values in the averaged image of A/2 and B/2, while each value in the first order vertical gradient map represents the difference between the current pixel values and the upper (or lower) neighboring vertical pixel values in the averaged image of A/2 and B/2. The gradient-based mipmap motion vector generator 522 generates a first order time gradient map by taking the difference between the mipmap associated with the first source image A (e.g., A/2) and the mipmap associated with the second source image B (e.g., B/2).

With the first order gradient maps (horizontal, vertical and time), the gradient-based mipmap motion vector generator 522 then generates second order gradient maps by element by element multiplication between the appropriate maps. For instance, the second order horizontal gradient map with respect to the horizontal is the result of the first order horizontal gradient map "dot-multiplied" by itself. "Dot-multiplied" or dot-multiplication refers to element multiplication. The second order vertical gradient map with respect to the vertical is the result of the first order vertical gradient map dot-multiplied by itself. The second order horizontal gradient map with respect to time is the result of the first order horizontal gradient map "dot-multiplied" by the first order time gradient map. The second order vertical gradient map with respect to time is the result of the first order vertical gradient map "dot-multiplied" by the first order time gradient map. The second order horizontal gradient map with respect to the vertical is the result of the first order horizontal gradient map "dot-multiplied" by the first order vertical gradient map.

Gradient-based mipmap motion vector generator 522 then optionally removes noise in each of the second order gradient maps by convolving each second order gradient map with an appropriate filter. For example, a filter represented by a matrix of suitable size having all 1's for values may be convolved with each of the second order gradient maps to generate noise-reduced second order gradient maps.

Finally, based on the noise-reduced second order gradient maps (or if noise reduction is not performed, based on the second order gradient maps), the gradient-based mipmap motion vector generator 522 generates, for each element in the mipmap motion vector map (e.g., MM2 motion vector map 530) motion vector components for the horizontal and vertical using any suitable algorithm. In one embodiment, the following formulae are used:

$$MVx=-Gxt/Gxx \text{ when } Gxx \text{ is not 0; otherwise 0;}$$

$$Mvy=-Gyt/Gyy \text{ when } Gyy \text{ is not 0; otherwise 0.}$$

The variable "Gmn" represents the noise-reduced "m" second order gradient map with respect to "n" wherein if "m" or "n" are set to: "x", this refers to the horizontal; "y", this refers to the vertical; "t", this refers to time. The variable "MVx" represents the motion vector value for the "x" or horizontal component for a particular value in the overall MM motion vector map (e.g., MM2 motion vector map); and the variable "MVy" represents the motion vector value for the "y" or vertical component for a particular value in the overall MM motion vector map (e.g., MM2 motion vector map). As is recognized, MVx and Mvy show the motion trajectory; motion vector values are signed numbers showing the actual direction of motion. The larger the absolute value of each of these variables, the larger the motion.

Although described above with respect to the specific formulae provided, it is recognized that any other suitable formulae or algorithm may be used to construct single-pass, gradient based mipmap motion vector maps.

Returning back to FIG. 5, the single-pass, gradient-based motion vector generator 408 further includes motion vector selector 538. Motion vector selector generates the image motion vector map 418 based on each of the mipmap motion vector maps (530-536, in this embodiment).

Figure 6:
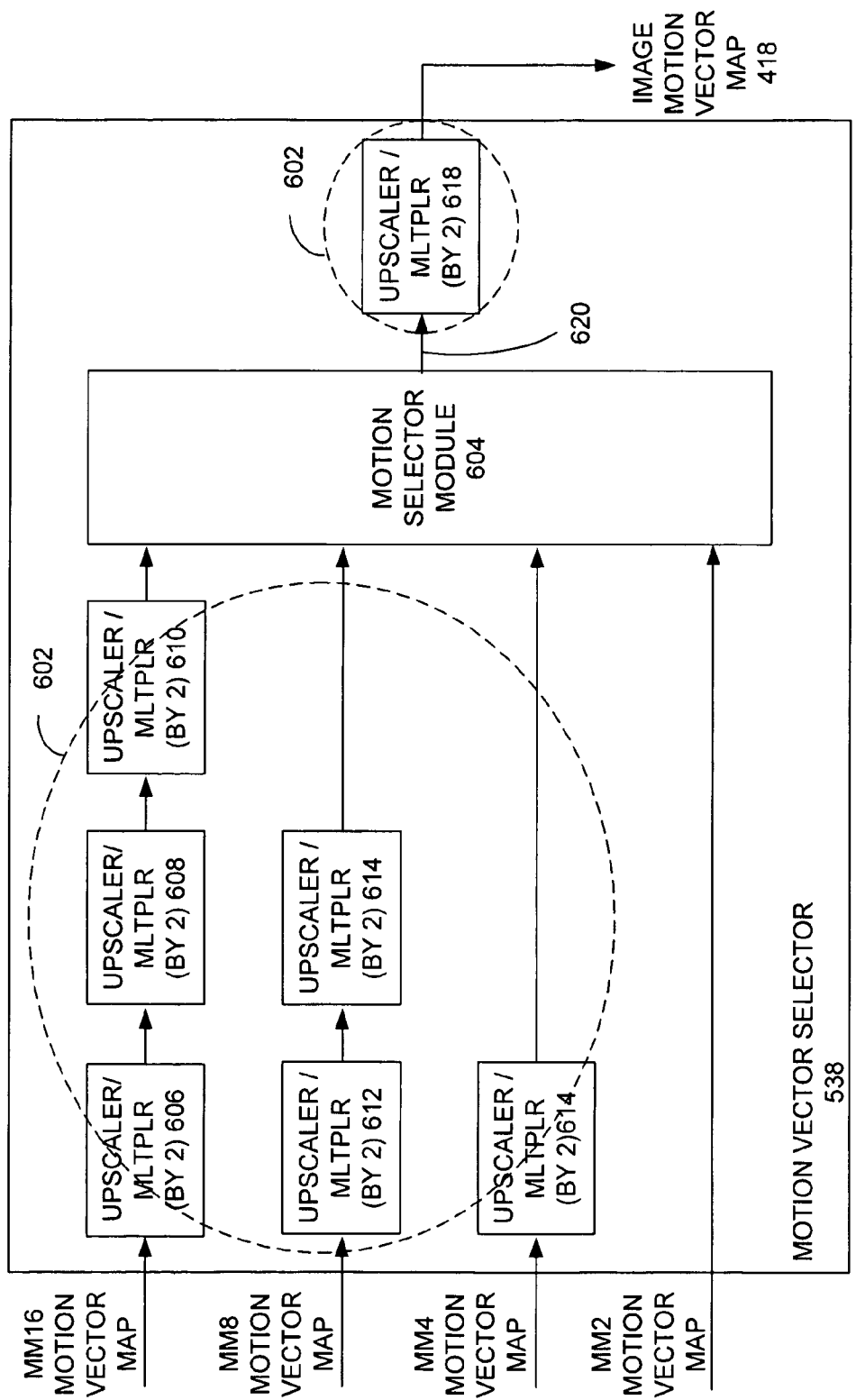
FIG. 6 illustrates an exemplary and more detailed block diagram of the motion vector selector of the single-pass, gradient-based motion vector generator of the integrated circuit of FIG. 4.

FIG. 6 illustrates an exemplary and more detailed block diagram of the motion vector selector 538 of the single-pass, gradient-based motion vector generator 408 of the integrated circuit 400 of FIG. 4. Motion vector selector 538 includes a plurality of upscalers 602 and a motion selector module 604. One or more of the plurality of upscalers 602 upscale each of the mipmap motion vector maps from the gradient-based mipmap motion vector generators of FIG. 5 that are smaller than the largest mipmap motion vector map to a size commensurate with the largest mipmap motion vector map. In the example provided, MM16 motion vector map, MM8 motion vector map and MM4 motion vector map are upscaled by upscalers 606-616 such that the result of the upscaling by upscalers 606-616 is that each of the MM16 motion vector map, the MM8 motion vector map and the MM4 motion vector map are at the same resolution size as the largest mipmap motion vector map, MM2 motion vector map. In the embodiment shown, each of the upscalers 606-616 are identical and upscaled its input by 2. Accordingly, three upscalers (e.g., 606-610) are needed for MM16 motion vector map, two upscalers (e.g., 612-614) are needed for MM8, and one upscaler (e.g., 616) is needed for MM4 motion vector map. In another embodiment, the one or more upscalers that upscale each of the mipmap motion vector maps may have different upscaling capabilities, as recognized by one having ordinary skill in the art. In one embodiment, each of the upscalers 606 is an upscaler/multiplier (as illustrated) and not only upscales but also multiplies each element associated with its input by the same values as the upscaler upscaled its input image. This causes each upscalers' output to have not only the proper size, but the proper values.

Motion selector module 604 receives each of the: largest mipmap motion vector map (e.g., MM2 motion vector map) from the gradient-based mipmap motion vector generators (e.g., gradient-based mipmap motion vector generator 522) and each of the upscaled motion vector maps and generates a final mipmap motion vector map 620 using a filter function. In one embodiment, the filter function implements s a median filter. In another embodiment, the filter function implements a mean filter. It is recognized that any suitable filter may be used to select and/or generate the final mipmap motion vector map 620 from one or more of the mipmap motion vector maps.

Upscaler 618 of the plurality 602 of upscalers receives the final mipmap motion vector map 620 and generates the image motion vector map 418 after upscaling the final mipmap motion vector map 620 to a sized commensurate with the first and second source images A, B. In one embodiment, upscaler 618 also multiplies each value within the final mipmap motion vector map 620 by the same value upon which upscaler 618 upscales the final mipmap motion vector 620. Image motion vector map 418 indicates the motion vectors for each element of source images A and B.

Figure 7:
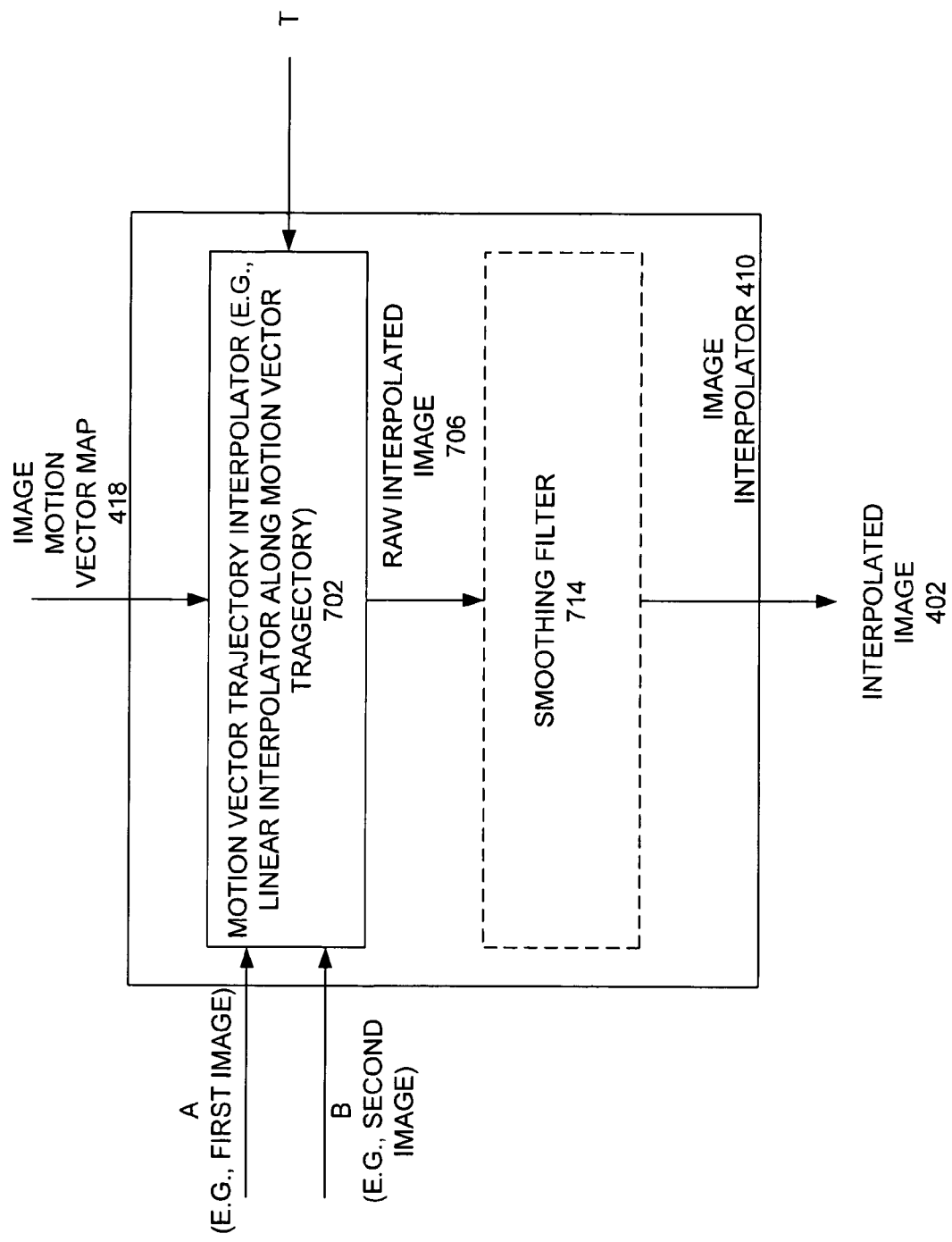
FIG. 7 illustrates an exemplary and more detailed block diagram of an image interpolator of the integrated circuit of FIG. 4.

FIG. 7 illustrates an exemplary and more detailed block diagram of an image interpolator 410 of the integrated circuit 400 of FIG. 4. Image interpolator 410 includes motion vector trajectory interpolator 702 and, optionally, smoothing filter 704. Assuming that first image A and second image B are consecutive images in the source sequence of images 304 having a first image rate defined in party by having a first period between consecutive images, the motion vector trajectory interpolator 702 generates a raw interpolated image 706 based on the first and second source images A, B by interpolating pixel values along the trajectory of motion for pixels in the first and second images A, B, as provided in the image motion vector map 418, at a time less than the first period, T. In one embodiment, T is fixed based on the device for which IC 400 is built. In another embodiment, T varies based upon the device to which the destination source images 306 are displayed. In such a case, T is calculated by any suitable logic and provided to the motion vector trajectory interpolator 702 using any suitable transmission conduit and/or memory. As used herein, logic refers to any integrated circuit(s) and/or processor(s). In one embodiment, motion vector trajectory interpolator performs a linear interpolation along the motion vector trajectory at time T. However, any suitable interpolation technique may be used. As is recognized, the raw interpolated image may present some "holes" in which the pixel values are not interpolated because none of the calculated motion trajectories in the image motion vector map 418 pass through these pixels. Smoothing filter 704 examines the raw interpolated image 706 and generates the interpolated image 402 by filling the uninterpolated pixel values with appropriate pixel values. In one embodiment, they are filled with nearest interpolated pixel values.

Returning to FIGS. 4 and 5, motion detector 412, generates a motion factor map 416 based on the smallest pair of mipmaps from the at least two pairs of mipmaps 416 (e.g., A/16 and B/16). Motion detector 412 uses any suitable algorithm to detect "enough" motion between the smallest pair of mipmaps such that object may be determined to be moving, non-moving, or somewhere in-between moving and non-moving with respect to the first and second source images, A and B. In other words, motion detector 412 detects a degree of motion between the first and second source images, A and B. In one embodiment, motion detector 412 applies the following formulae to determine each value within the motion factor map.

$$\text{Min}(1, \text{absdiff}(A16, B16)/\text{threshold\_value}).$$

Wherein: the operator "Min(m,n)" returns the smaller value of m and n; the operator "absdiff(m,n)" returns the absolute value difference between m and n; and the variable "threshold\_value" is set to any suitable value to detect the appropriate degree of motion. In one embodiment, "threshold_value"=8. Thereafter, the result of the above formulae is enlarged (i.e., upscaled) to generator the motion factor map such that the motion vector map 416 has the same size as A, B. In this embodiment, that enlargement value is 16. In this embodiment, each value of the motion factor map is between 0 and 1. When equal to 0, the value of the motion factor map indicates that this area of the first image A is a non-moving area. When equal to 1, the value of the motion factor map indicates that this is a motion area. Intermediate areas indicate an intermediate degree of motion.

Returning to FIG. 4, blending module 414 generates the blended upconverted new image based on the interpolated image 402, a source image (A or B) and the motion factor map 416, wherein each value of the motion factor map 416 indicates the contribution of at least one of: the interpolated image 402 and the source image (A or B) to the blended, upconverted new image 404. While any suitable blending formulae may be used, one example capable of blending the interpolated image 402 with the second image B is:

> Blended, upconverted new image=(Motion factor map 416).*(Interpolated image 402–second image B)+Second image B.

Figure 1:
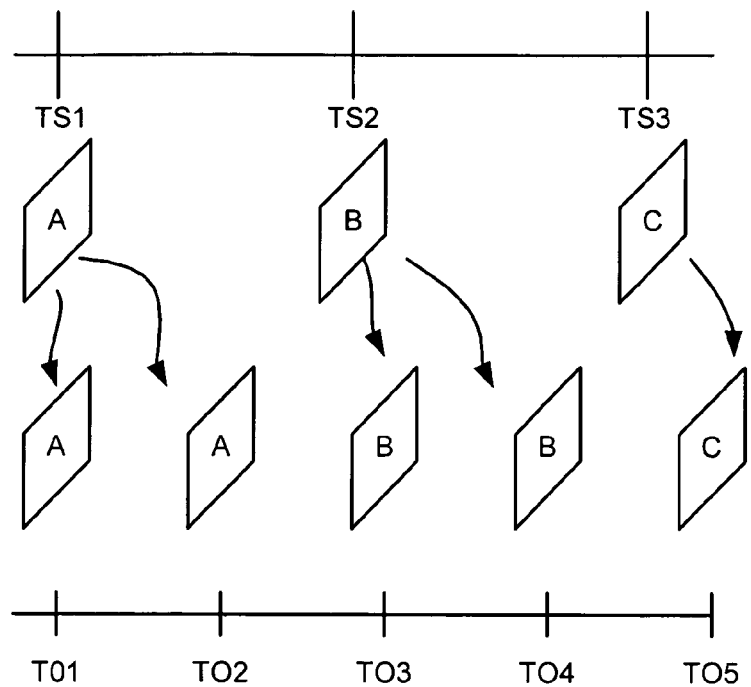
FIG. 1 illustrates a block diagram of exemplary source and destination image sequences, where the exemplary destination image sequence is the result of a prior art sample and hold upconversion.
Figure 8:
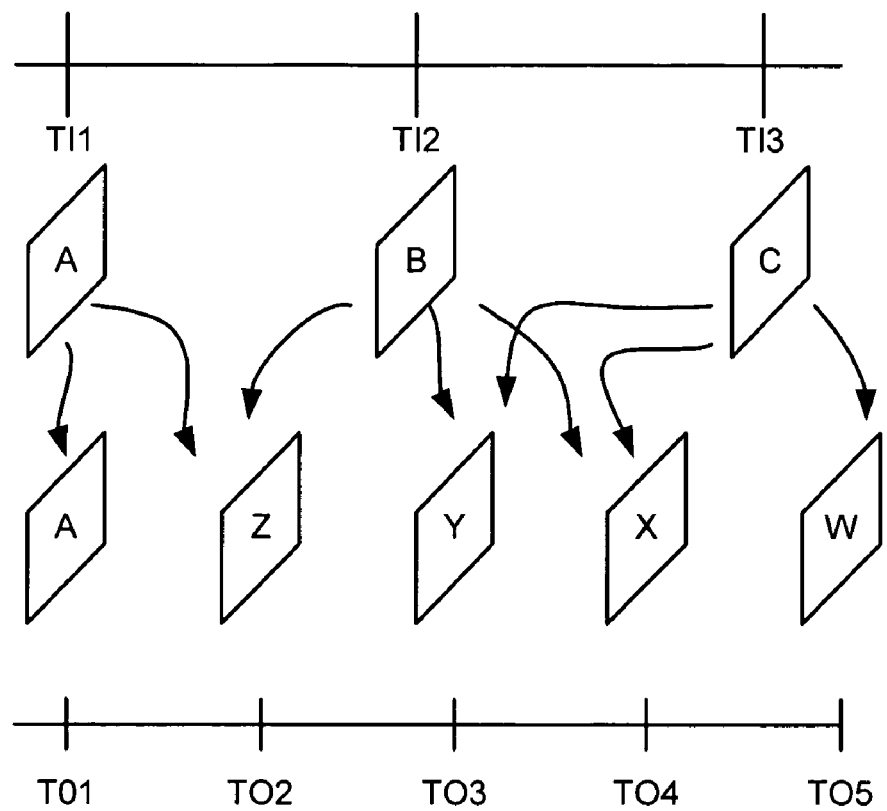
FIG. 8 illustrates a block diagram of exemplary source and destination image sequences, where the exemplary destination image sequence is the result of a single-pass, gradient-based upconversion in accordance with one embodiment of the present disclosure.

FIG. 8 illustrates a block diagram of exemplary source and destination image sequences, where the exemplary destination image sequence is the result of a single-pass, gradient-based upconversion in accordance with one embodiment of the present disclosure. The source image sequences are the same as illustrated and described with respect to FIG. 1. However, unlike the destination image sequence from FIG. 1, the destination image sequence of FIG. 8 has image Z displayed at time TO2, image Y displayed at time TO3, image X displayed at time TO4 and image W at time TO5. Image Z is the result of images A and B, image Y is the result of images B and C, image X is the result of images B and C, and image W is the result of image C and the next image in the source sequence of images. Accordingly, objects in images A, Z, Y, X and W are located along their respective motion trajectories. Because each image of the destination sequences was generated as a result of the single-pass, gradient-based upconversion as discussed above, the negative artifacts associated with same and hold upconversions and the negative aspects of prior art motion compensation upconversion are mitigated.

Figure 9:
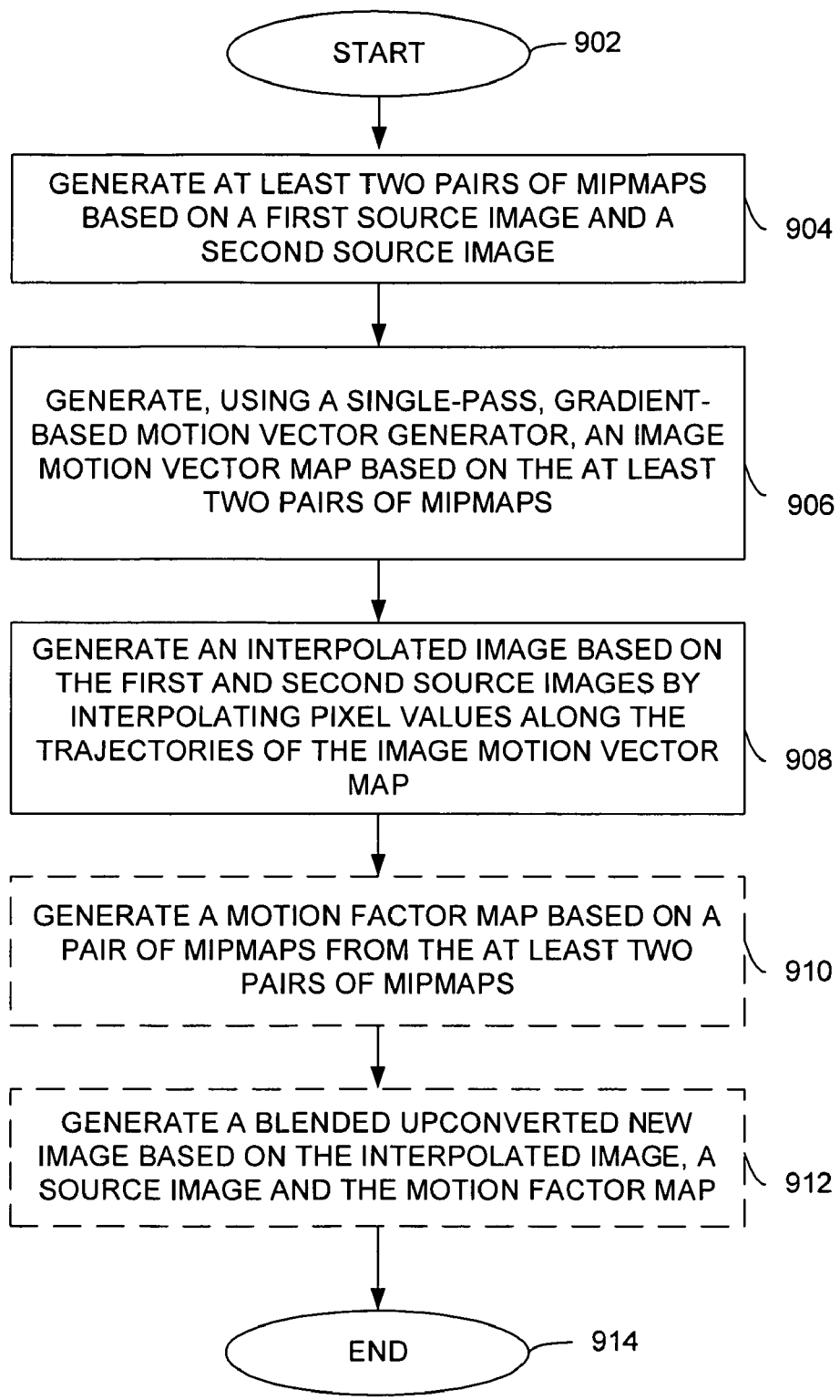
FIG. 9 is a flow chart of an exemplary method for single-pass, gradient-based upconversion in accordance with one embodiment of the present disclosure.

FIG. 9 is a flow chart of an exemplary method for single-pass, gradient-based upconversion in accordance with one embodiment of the present disclosure. The method begins in block 902 where, for example, a sequence of source images is provided for upconversion. The images may be accesses from memory or provided from any suitable source of images (e.g., a live video stream from the Internet). The method includes block 904 where at least two pairs of mipmaps based on a first source image and a second source image are generated. In one embodiment, this may be implemented using mipmap generator 406 of FIG. 4 as discussed above. The method next includes block 906 where, using a single-pass, gradient-based motion vector generator, an image motion vector map is generated based on the at least two pairs of mipmaps. In one embodiment, this may be implemented using, for example, the single-pass, gradient-based motion vector generator 408 of FIG. 4 as discussed above. The method next includes block 908 where an interpolated image based on the first and second source images is generated by interpolating pixel values along the trajectories of the image motion vector map. In one embodiment, this may be implemented using, for example, image interpolator 410 of FIG. 4 as discussed above. Optionally, the method includes block 910 where a motion factor map based on a pair of mipmaps from the at least two pairs of mipmaps is generated. In one embodiment, this may be implemented using the motion detector 412 of FIG. 4 as discussed above. The method may optionally include block 912 where a blended upconverted new image is generated based on the interpolated image, a source image and the motion factor map. In one embodiment, this is implemented using blending module 414 as discussed above. Finally, the method ends in block 914 where, for example, the blended upconverted new image is stored for subsequent processing, sent to a display, etc.

FIG. 10 is an exemplary flow chart of a method for block 904 of FIG. 9, generating at least two pairs of mipmaps. The method begins with block 1002 where the first source image is serially downscaled to generate the first mipmaps of each of the at least two pairs of mipmaps. The method ends with block 1004 where the second source image is serially downscaled to generate the second mipmaps of each of the at least two pairs of mipmaps. In one embodiment, both blocks 10002 and 1004 may be implemented using, e.g., the plurality of downscalers 502 of FIG. 5 as discussed above.

FIG. 11 is an exemplary flow chart of block 906 of FIG. 9, generating, using a single-pass, gradient-based motion vector generator, an image motion vector map. The method begins in block 1102 where at least two mipmap motion vector maps are generated based on a respective pair of mipmaps using at least two gradient-based mipmap motion vector generators. In one embodiment, this may be implemented using two or more of the gradient-based mipmap motion vector generators 522-528 of FIG. 5 as discussed above. The method ends with block 1104 where the image motion vector map is generated based on each of the mipmap motion vector maps. In one embodiment, this may be implemented using motion vector selector 538 of FIG. 5 as discussed above.

As illustrated, block 1104 may include blocks 1106-1110 where, e.g., each of the mipmap motion vector maps that are smaller than the largest mipmap motion vector map are upscaled to a size commensurate with the largest mipmap motion vector map. Next, the motion vectors in each of the mipmap motion vector maps are filtered to generate a final mipmap motion vector map. Finally, the final mipmap motion vector map is upscaled to generate the image motion vector map. In one embodiment, the method of blocks 1106-1110 may be implemented using the upscalers 602 and the motion selector module 604 of FIG. 6 as discussed above.

Figure 12:
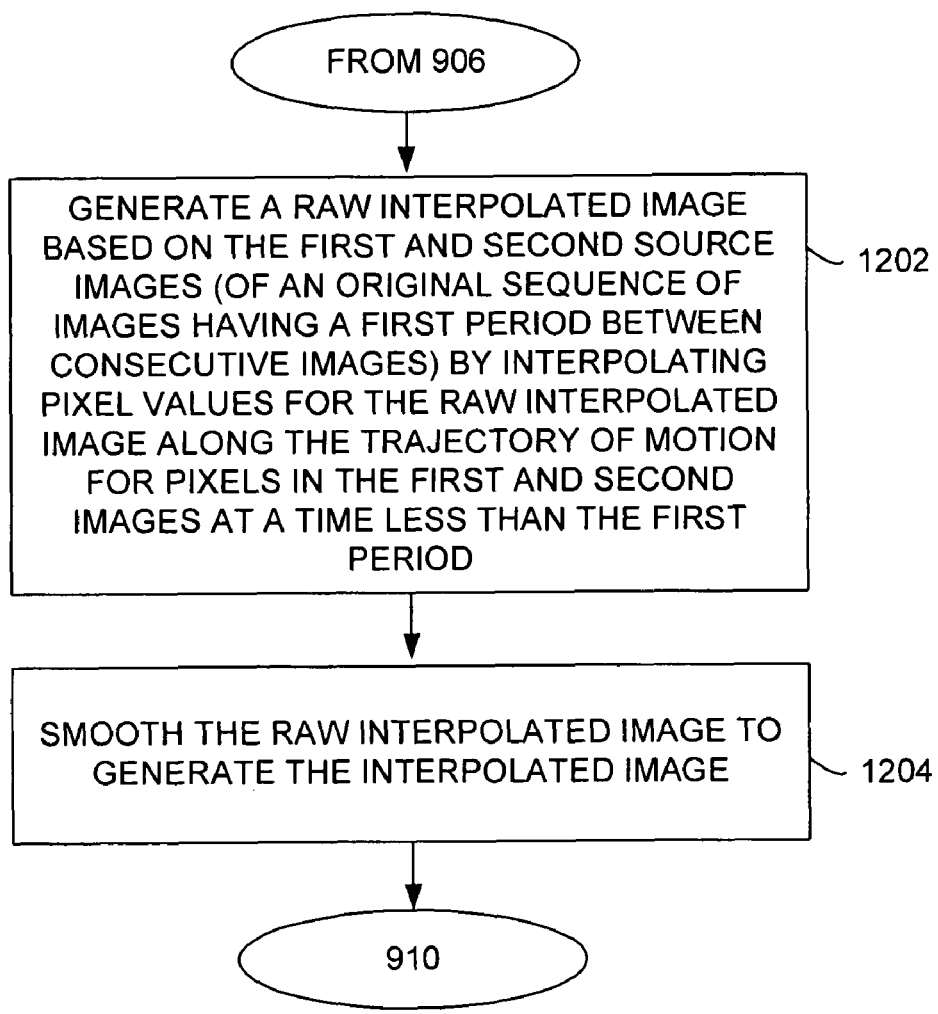
FIG. 12 is an exemplary flow chart of a method for generating an interpolated image based on the first and second source images by interpolating pixel values along the trajectories of the image motion vector map in accordance with the method of FIG. 9.

FIG. 12 is an exemplary flow chart of the method pf block 908 of FIG. 9, generating an interpolated image based on the first and second source images by interpolating pixel values along the trajectories of the image motion vector map. The method begins in block 1202 where a raw interpolated image is generated based on the first and second source images by interpolation pixel values for the raw interpolated image along the trajectory of motion for pixels in the first and second images at a time less than the first period (the period of the sequence of images including the first and second images). In one embodiment, this may be implemented using the motion vector trajectory interpolator 702 of FIG. 7 as described above. Lastly, the method includes block 1204 where the raw interpolated image is smoothed to generate the interpolated image. In one embodiment, this may be implemented using the smoothing filter 714 as described above.

Among other advantages, the above method and apparatus enables upconversion of a source sequence of images to create a destination sequence of images having a higher image rate while avoiding the expense of the prior art and the adverse judder artifacts of the prior art. As recognized, either interpolated image 402 or blended upconverted new image 404 may be used as an upconverted new image in the destination sequence of images. The above method and apparatus may be implemented in dedicated hardware to avoid using complex programmable shaders. However, it is recognized that any suitable logic may be used to implement the above method and apparatus. Other advantages will be recognized by one of ordinary skill in the art. It will also be recognized that the above description describes mere examples and that other embodiments are envisioned and covered by the appended claims. It is therefore contemplated that the present invention cover any and all modifications, variations or equivalents that fall within the spirit and scope of the basic underlying principles disclosed above and claimed herein.

For example, in one embodiment, an integrated circuit is provided that includes a single-pass, gradient-based motion vector generator 408 and a mipmap generator 406. The single-pass, gradient-based motion vector generator 408 is operative to generate the image motion vector map 418 based on at least two pairs of mipmaps that, in turn, are based on a first source image and a second source images. For example, the first mipmap of each pair of mipmaps is a downsized version of the first source image and the second mipmap of each pair of mipmaps is a downsized version of the second source image. In this embodiment, the single-pass, gradient-based motion vector generator 408 is coupled to the mipmap generator 406 and generates the image motion vector map 418. As is recognized, the image motion vector map 418 may be used for, among other things, interpolating an image such as interpolated image 402.

What is claimed is:

1. An integrated circuit comprising:
   a gradient-based motion vector generator operative to generate an image motion vector map based on a first source image and a second source image, wherein the image motion vector map represents the trajectory of motion for pixels in the first and second source images;
   an image interpolator operative to generate an interpolated image based on the first and second source images by interpolating pixel values along the trajectories of the image motion vector map; and
   a mipmap generator operative to generate at least two pairs of mipmaps based on the first source image and the second source image, wherein a first mipmap of each pair of mipmaps is a downsized version of the first source image, wherein a second mipmap of each pair of mipmaps is a downsized version of the second source image, and wherein the gradient-based motion vector generator is operative to generate the image motion vector map based on the at least two pairs of mipmaps.

2. The integrated circuit of claim 1, further comprising:
   a motion detector operative to generate a motion factor map based on a pair of mipmaps from the at least two pairs of mipmaps, wherein the motion factor map represents a detected degree of motion between the first and second source images; and
   a blending module operative to generate a blended upconverted new image based on the interpolated image, the motion factor map and one of the first and the second source images, wherein the motion factor map affects the contribution of at least one of: the interpolated image and the one of the first and second source images to the blended upconverted new image.

3. The integrated circuit of claim 1, wherein the mipmap generator comprises:
   a first plurality of serially-coupled downscalers associated with the first source image, operative to generate the first mipmaps of each of the at least two pairs of mipmaps and wherein the first downscaler of the first plurality generates a mipmap based on the first source image, and wherein each other downscaler of the first plurality generates a mipmap based on a previously generated mipmap from the first plurality; and
   a second plurality of serially-coupled downscalers associated with the second source image, operative to generate the second mipmaps of each of the at least two pairs of mipmaps and wherein the first downscaler of the second plurality generates a mipmap based on the second source image, and wherein each other downscaler of the second plurality generates a mipmap based on a previously generated mipmap from the second plurality.

4. The integrated circuit of claim 1, wherein the gradient-based motion vector generator comprises:
   at least two gradient-based mipmap motion vector generators, wherein each is operative to generate a mipmap motion vector map based on a respective pair of mipmaps, wherein each mipmap motion vector map represents the trajectory of motion for pixels in the respective pair of mipmaps;
   a motion vector selector operative to generate the image motion vector map based on each of the mipmap motion vector maps.

5. The integrated circuit of claim 4, wherein the motion vector selector comprises:
   a plurality of upscalers, where one or more of the at least one upscalers are operative to upscale each of the mipmap motion vector maps that are smaller than the largest mipmap motion vector map to a size commensurate with the largest mipmap motion vector map; and
   a motion selector module operatively operative to filter motion vectors in each of the: largest mipmap motion vector map from the at least two gradient-based mipmap motion vector generators and one or more of the upscaled mipmap motion vector maps to generate a final mipmap motion vector map,
   wherein another upscaler of the plurality of upscalers is operative to upscale the final mipmap motion vector map and to generate the image motion vector map,
   wherein each upscaler of the plurality of upscalers is operative to upscale and multiply each motion vector value associated with each of the mipmap motion vector maps and with the final mipmap motion vector map by an equal value such that the image motion vector map has the same size as the first and second images.

6. The integrated circuit of claim 5, wherein the motion selector module is one of a median filter and a mean filter.

7. The integrated circuit of claim 1, wherein the first and second source images are consecutive images in an original sequence of images having a first image rate defined in part by having a first period between consecutive images and wherein the image interpolator comprises:
   a motion vector trajectory interpolator operative to generate a raw interpolated image based on the first and second source images and by interpolating pixel values for the raw interpolated image along the trajectory of motion for pixels in the first and second images at a time less than the first period; and
   a smoothing filter operative to smooth the raw interpolated image and to generate the interpolated image.

8. The integrated circuit of claim 2, wherein the blending module is operative to:
   subtract each value in the first or second source image from each value in the interpolated image to generate a difference map;

multiply each value in the difference map by the motion factor map to generate a compensated difference map; and add each value in the compensated difference map to the first or second source image to generate the upconverted new image.

9. The integrated circuit of claim 1, wherein the integrated circuit is one of:
   a baseband video processing unit; and
   part of a baseband video processing unit.

10. The integrated circuit of claim 1, wherein the first and second source images are consecutive images in an original sequence of images having a first image rate defined in part by having a first period between consecutive images and wherein the interpolated image represents an upconverted image for use in an upconverted image sequence having a different image rate than the first image rate.

11. The integrated circuit of claim 2, wherein the first and second source images are consecutive images in an original sequence of images having a first image rate defined in part by having a first period between consecutive images and wherein the blended upconverted new image represents an upconverted image for use in an upconverted image sequence having a different image rate than the first image rate.

12. A method for generating an upconverted new image, comprising:
   generating, using a gradient-based motion vector generator, an image motion vector map based on the first source image and the second source image, wherein the image motion vector map represents the trajectory of motion for pixels in the first and second source images;
   generating an interpolated image based on the first and second source images by interpolating pixel values along the trajectories of the image motion vector map; and
   generating at least two pairs of mipmaps based on the first source image and the second source image, wherein a first mipmap of each pair of mipmaps is a downsized version of the first source image, wherein a second mipmap of each pair of mipmaps is a downsized version of the second source image, and wherein the gradient-based motion vector generator is operative to generate the image motion vector map based on the at least two pairs of mipmaps.

13. The method of claim 12, further comprising:
   generating a motion factor map based on a pair of mipmaps from the at least two pairs of mipmaps, wherein the motion factor map represents a detected degree of motion between the first and second source images; and
   generating a blended upconverted new image based on the interpolated image, the motion factor map and one of the first and second source images, wherein the motion factor map affects the contribution of at least one of: the interpolated image and the one of the first and second source images to the blended upconverted new image.

14. The method of claim 12, wherein generating at least two pairs of mipmaps based on the first source image and the second source image comprises:
   serially downscaling the first source image to generate the first mipmaps of each of the at least two pairs of mipmaps; and
   serially downscaling the second source image to generate the second mipmaps of each of the at least two pairs of mipmaps.

15. The method of claim 12, wherein generating, using the gradient-based motion vector generator, an image motion vector map based on the at least two pairs of mipmaps comprises:
   generating, using at least two gradient-based mipmap motion vector generators, at least two mipmap motion vector maps based on a respective pair of mipmaps, wherein each mipmap motion vector map represents the trajectory of motion for pixels in the respective pair of mipmaps; and
   generating the image motion vector map based on each of the mipmap motion vector maps.

16. The method of claim 15, wherein generating the image motion vector map based on each of the mipmap motion vector maps comprises:
   upscaling each of the mipmap motion vector maps that are smaller than the largest mipmap motion vector map to a size commensurate with the largest mipmap motion vector map;
   filtering motion vectors in each of the largest mipmap motion vector map from the at least two gradient-based mipmap motion vector generators and one or more of the upscaled mipmap motion vector maps to generate a final mipmap motion vector map; and
   upscaling the final mipmap motion vector map to generate the image motion vector map
   wherein upscaling each of the mipmap motion vector maps and the final mipmap motion vector map comprises upscaling and multiplying each motion vector value associated with each of the mipmap motion vector maps and with the final mipmap motion vector map by an equal value such that the image motion vector map has the same size as the first and second images.

17. The method of claim 16, wherein the filtering of motion vectors in each of the mipmap motion vector maps to generate the final mipmap motion vector map comprises applying one of a median filter and a mean filter to each of the mipmap motion vector maps.

18. The method of claim 12, wherein the first and second source images are consecutive images in an original sequence of images having a first image rate defined in part by having a first period between consecutive images and wherein generating the interpolated image based on the first and second source images by interpolating pixel values along the trajectories of image motion vector map comprises:
   generating a raw interpolated image based on the first and second source images by interpolating pixel values for the raw interpolated image along the trajectory of motion for pixels in the first and second images at a time less than the first period; and
   smoothing the raw interpolated image to generate the interpolated image.

19. The method of claim 13, wherein generating a blended upconverted new image based on the interpolated image, the first or second source image and the motion factor map comprises:
   subtracting each value in the second source image from each value in the interpolated image to generate a difference map;
   multiplying each value in the difference map by the motion factor map to generate a compensated difference map; and
   adding each value in the compensated difference map to the first or second source image to generate the upconverted new image.

20. The method of claim 12, wherein the first and second source images are consecutive images in an original sequence of images having a first image rate defined in part by having a first period between consecutive images and wherein the interpolated image represents an upconverted image for use in an upconverted image sequence having a different image rate than the first image rate.

21. The method of claim 13, wherein the first and second source images are consecutive images in an original sequence of images having a first image rate defined in part by having a first period between consecutive images and wherein the blended upconverted new image represents an upconverted image for use in an upconverted image sequence having a different image rate than the first image rate.

22. A video processing device comprising:
a mipmap generator operative to generate at least two pairs of mipmaps based on a first source image and a second source image, wherein the first and second source images are consecutive images in an original sequence of images having a first image rate defined in part by having a first period between consecutive images and wherein a first mipmap of each pair of mipmaps is a downsized version of the first source image and wherein a second mipmap of each pair of mipmaps is a downsized version of the second source image;
at least two gradient-based mipmap motion vector generators, wherein each is operative to generate a mipmap motion vector map based on a respective pair of mipmaps, wherein each mipmap motion vector map represents the trajectory of motion for pixels in the respective pair of mipmaps;
a motion vector selector operative to generate an image motion vector map based in part on filtering motion vectors in each of the mipmap motion vector maps using a median filter, wherein the image motion vector map represents the trajectory of motion for pixels in the first and second source images; and
an image interpolator operative to generate an interpolated image based on the first and second source images by interpolating pixel values along the trajectories of the image motion vector map at a time less than the first period.

23. The video processing device of claim 22, further comprising:
a motion detector operative to generate a motion factor map based on the smallest pair mipmaps from the at least two pairs of mipmaps, wherein the motion factor map represents a detected degree of motion between the first and second source images; and
a blending module operative to generate a blended upconverted new image based on the interpolated image, the motion factor map and one of the first and second source images, wherein the motion factor map affects the contribution of at least one of: the interpolated image and the second source image to the blended upconverted new image,
wherein the blending module is operative to:
subtract each value in the first or second source image from each value in the interpolated image to generate a difference map,
multiply each value in the difference map by the motion factor map to generate a compensated difference map, and
add each value in the compensated difference map to the first or second source image to generate the upconverted new image.

24. An integrated circuit comprising:
a mipmap generator operative to generate at least two pairs of mipmaps based on a first source image and a second source image, wherein a first mipmap of each pair of mipmaps is a downsized version of the first source image, wherein a second mipmap of each pair of mipmaps is a downsized version of the second source image; and
a single-pass, gradient-based motion vector generator operative to generate an image motion vector map based on the at least two pairs of mipmaps, wherein the image motion vector map represents the trajectory of motion for pixels in the first and second source image.

* * * * *